United States Patent
Venkatasubramanian et al.

(10) Patent No.: US 7,840,455 B1
(45) Date of Patent: Nov. 23, 2010

(54) SYSTEM AND METHOD OF DETECTING FRAUDULENT OR ERRONEOUS INVOICES

(75) Inventors: Ramshankar Venkatasubramanian, Santa Clara, CA (US); Hartmut K. Vogler, Foster City, CA (US); Hila Schlank, Sunnyvale, CA (US); Heinz U. Roggenkemper, Los Gatos, CA (US)

(73) Assignee: SAP AG, Walldorf (DE)

( * ) Notice: Subject to any disclaimer, the term of this patent is extended or adjusted under 35 U.S.C. 154(b) by 1189 days.

(21) Appl. No.: 11/203,736

(22) Filed: Aug. 15, 2005

(51) Int. Cl.
*G07F 17/00* (2006.01)

(52) U.S. Cl. .......................... 705/30; 705/34
(58) Field of Classification Search ................. 705/30, 705/34, 24; 715/200
See application file for complete search history.

(56) References Cited

U.S. PATENT DOCUMENTS

| | | | |
|---|---|---|---|
| 6,058,380 A * | 5/2000 | Anderson et al. | 705/40 |
| 6,882,986 B1 * | 4/2005 | Heinemann et al. | 705/40 |
| 7,356,606 B2 * | 4/2008 | Choate | 709/232 |
| 7,389,286 B2 * | 6/2008 | Holmes et al. | 707/3 |
| 2005/0149365 A1 * | 7/2005 | Johnson | 705/4 |

* cited by examiner

*Primary Examiner*—Ramsey Refai
(74) *Attorney, Agent, or Firm*—Fountainhead Law Group PC

(57) ABSTRACT

In one embodiment, the present invention includes methods for detecting fraudulent or erroneous invoices that use an associative memory and models of valid invoices. Incoming invoices may be applied against the models of valid invoices, and the models may access the associations of data elements in an associative memory and provide results to a decision engine. The decision engine may flag invoices that are non-conforming for further analysis. As more invoices and information about the invoices are gathered, the models and associative memory may be adapted to improve detection performance.

13 Claims, 5 Drawing Sheets

500

SYSTEM AND METHOD OF DETECTING FRAUDULENT OR ERRONEOUS INVOICES

BACKGROUND

The present invention relates to detecting fraudulent or erroneous invoices, and in particular, to a system and method of detecting fraudulent or erroneous invoices as submitted to an automated invoice processing system such as an Enterprise Resource Planning (ERP) system.

In some corporations, the use of enterprise management systems has dramatically streamlined the processing of payable invoices by automating many steps that used to be performed manually. In many situations where an actual person used to be involved, seemingly small, but hugely consequential, judgments and decisions were made on a daily basis regarding the validity of invoices. For accounts payable personnel, the ability to spot potentially fraudulent or erroneous invoices is based on experience. Generally, an experienced professional can make such a determination manually if the necessary information is available. However, as more and more of the accounts payable process is automated with ever evolving ERP systems, there are fewer and fewer steps along the way in which a person might identify a possibly fraudulent or erroneous invoice. This situation has inspired opportunistic frauds to exploit loopholes, cracks, and weaknesses in current automated or semi-automated invoice processing systems. Recently, large corporations have been subject to large financial losses stemming from either fraudulent or erroneous invoices.

By submitting fraudulent invoices criminals hope to take advantage of the fact that many payment protocols are fully or partially automated and that those automation systems will not detect minor modifications or discrepancies, and thus send or reroute payments for goods or services that were neither ordered nor received. Erroneous invoices on the other hand may result from unintentional errors on the part of a vendor's employees. Such scenarios are best illustrated by example.

In one scenario, a criminal might try to submit an invoice that looks identical to a actual vendor's valid invoice but with payment address or bank information altered so that if funds are sent out, they will go to the criminals address or bank account. Many current ERP systems may not check the validity or correctness of where payment should be sent.

In another scenario, an invoice may be accidentally sent by a vendor twice, leading to a duplicate. If the amount due and purchase order number are valid, and the vendor is a known good vendor, some existing invoice processing systems may erroneously pay the invoice twice according to the terms of the invoice. In a manual payment system, an accounts payable clerk might notice that a second duplicate invoice has already been paid and take corrective action. But in automated systems, such errors may go undetected.

Many current fraud detection systems approach the problem of fraudulent or erroneous invoices by attempting to screen incoming invoices for known variations on how an invoice can contain fraudulent information or errors. In other words, current approaches attempt to screen fraudulent or erroneous invoices by defining rules that screen out bad invoices. One problem with such an approach is that it is nearly impossible to predict, program, and screen all possible variations of fraudulent or erroneous invoices. Therefore, existing fraud and error detection systems typically execute extremely complex and lengthy algorithms that search for indicia of known frauds or errors only. Such systems are not adept at detecting new fraudulent activities or errors.

Thus, there is a need for a system and method of detecting fraudulent and erroneous invoices in a way that will improve the efficiency, speed, and accuracy of payment for valid invoices and decrease the number of fraudulent and erroneous invoices that are paid using current systems and methods. The present invention solves these and other problems by providing fraud and error detection systems and methods that use adaptive system techniques for continually improving detection performance.

SUMMARY

Embodiments of the present invention include systems and methods for fraudulent or erroneous invoice detection in an automated invoice processing system. In one embodiment, the present invention includes methods for detecting fraudulent or erroneous invoices that use an associative memory and models of valid invoices. Incoming invoices may be applied against the models of valid invoices, and the models may access the associations of data elements in an associative memory and provide results to a decision engine. The decision engine may flag invoices that are nonconforming for further analysis. As more invoices and information about the invoices are gathered, the models and associative memory may be adapted to improve detection performance.

In one embodiment, the present invention includes a method of processing invoices comprising receiving an invoice electronically in an invoice processing system, applying the invoice against one or more valid invoice models, and in accordance therewith, identifying conforming or nonconforming invoices, and adapting at least one of the one or more valid invoice models using context data corresponding to the invoice.

In one embodiment, the context data corresponding to the invoice includes transaction history data.

In one embodiment, the method further comprises verifying the invoices to generate invoice feedback data. In another embodiment, the at least one of the one or more valid invoice models is adapted using the feedback data.

In one embodiment, the invoice models access associations between data elements using an associative memory.

In one embodiment, the method further comprises generating an initial invoice model from a valid invoice template.

In one embodiment, the method further comprises generating an initial association in an associative memory using a valid invoice template.

In another embodiment, the present invention includes a method of processing invoices comprising storing a template corresponding to a valid invoice, storing context data, generating a valid invoice model from the template and context data, and applying an invoice against the valid invoice model.

In one embodiment, the method further comprises flagging the invoice if the invoice model indicates that the invoice is nonconforming.

In another embodiment, the method further comprises sending the invoice to a user for investigation and adapting the valid invoice model based on feedback from the user.

In one embodiment, the method further comprises verifying the invoice if the invoice model indicates that the invoice is conforming.

In another embodiment, the method further comprises adapting the valid invoice model based on feedback data generated while verifying the invoice.

In one embodiment, the method further comprises accessing associations between data using an associative memory.

In another embodiment, the method further comprises adapting the associative memory using transaction history data.

According to another embodiment, the present invention includes an automated invoice processing system comprising a context data store, an associative memory coupled to the context data store, and a learning engine, wherein the learning engine receives data corresponding to one or more invoices and generates at least one invoice model and adapts associations between data elements in the associative memory.

In one embodiment, the data corresponding to one or more invoices comprises a valid invoice template comprising rules specifying a valid invoice.

In one embodiment, the system further comprises a decision engine, wherein invoices are received and applied against the at least one invoice model, and the decision engine flags nonconforming invoices.

In another embodiment, the system receives invoices electronically, wherein the at least one invoice model and associative memory are adapted after the received invoices are processed by the decision engine.

In one embodiment, the context data store includes transaction history data.

In one embodiment, the context data store includes vendor master data.

Additional embodiments will be evident from the following detailed description and accompanying drawings, which provide a better understanding of the nature and advantages of the present invention.

DETAILED DESCRIPTION

Described herein are systems and methods for fraudulent or erroneous invoice detection. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

In one embodiment, the present invention improves fraud and error detection in invoice systems by using an associative memory that creates associations between invoice related information. Incoming invoices may be applied to invoice models that leverage the associations between the invoice related information (or data elements) to determine when an incoming invoice is potentially fraudulent or erroneous. For example, instead of looking directly for evidence of known frauds or errors, embodiments of the present invention detect fraud or errors by examining deviations from valid invoices based on transaction history and other context information. Incoming invoices may be received and applied to invoice models that are derived from invoices that are known to be good (i.e., not fraudulent or erroneous). Invoices that fall outside of what a good invoice is supposed to look like (i.e., nonconforming invoices) may be automatically detected and flagged for further investigation by accounting or accounts payable personnel. Additionally, known good invoice models may be adapted over time so that information about invoices processed by the system over time can be used to improve the invoice models. For example, the particular characteristic or data of an invoice that caused the invoice to be flagged may be used to improve the invoice model. In this way, future invoices with that particular characteristic or data can be automatically processed with more accurate results.

Figure 1:
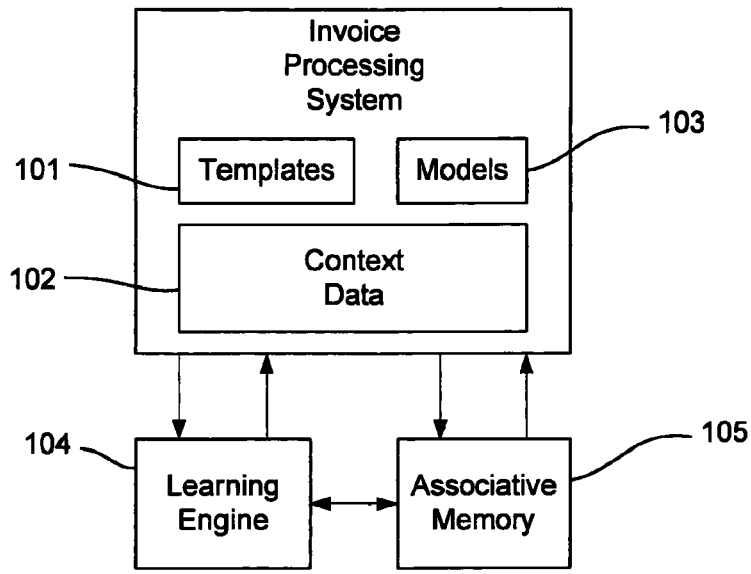
FIG. 1 illustrates a system for processing an invoice according to one embodiment of the present invention.

FIG. 1 illustrates a system 100 for processing an invoice according to one embodiment of the present invention. In one embodiment, the present invention includes an invoice processing system 100 that includes templates 101, context data 102, valid invoice models 103, a learning engine 104, and an associative memory 105. Invoice processing system 100 may receive invoices electronically and may automatically process the invoices for payment. Processing the invoices includes analyzing the data associated with each invoice to determine if the invoice is fraudulent or erroneous. In one embodiment, invoices are applied against valid invoice models to determine if the invoices are valid (i.e., conforming) or fraudulent or erroneous (i.e., nonconforming). If an invoice is conforming, then it may be automatically passed through the system for payment. If an invoice in nonconforming, then such invoice may be flagged or otherwise identified as nonconforming, and additional information about the invoice may be obtained or gathered (e.g., an employee of the invoice recipient may investigate the invoice).

Templates 101 may be valid invoice templates that are used to generate valid invoice models. Templates 101 may define the parameters of valid invoices. For example, one or more templates may define attributes of incoming invoices as well as the boundaries of such attributes. An initial template (i.e., a seed template) may be transmitted to the learning engine 104 to generate an initial valid invoice model and associations in the memory that may be used to analyze incoming invoices. Context data 102 may include vendor master data, transaction history data (e.g., past invoices or any data associated with a transaction), and any other data or information associated with vendors or transactions. Context data 102 may also be sent to learning engine 104 and used to generate the invoice models 103 and associations in associative memory 105.

Embodiments of the present invention include an associative memory that defines links or connections between context data elements. For example, an associative memory may indicate that data element "A" and data element "B" are related in some way. Invoice models leverage these relations. Invoice models 103 are rules or patterns that further define the associations. For example, if data element "A" is an account number and data element "B" is a phone number, then an invoice model may include a rule that for a particular vendor, the account number on the invoice is the same as the vendor's phone number. It is readily apparent that a wide variety rules or patterns may exist in an invoice model. In one embodiment, incoming invoices may be applied against the invoice models 103. The invoice models and associations may be used to determine whether or not the incoming invoice data is fraudulent or erroneous.

As each invoice is received and processed, learning engine 104 may receive additional information about each invoice and use such additional information to update the invoice models 103 and associative memory 105. For example, if an invoice is incorrectly identified as nonconforming (i.e., a false positive), additional information gathered about the invoice (e.g., during a manual investigation) may be sent to learning engine 104 to update an invoice model so that the model will not incorrectly identify such invoices as nonconforming in the future. As another example, if an invoice is incorrectly identified as conforming (i.e., a false negative), then additional information about the invoice may be sent to learning engine 104 to update an invoice model so that the model will not incorrectly identify such invoices as conforming in the future.

Figure 2:
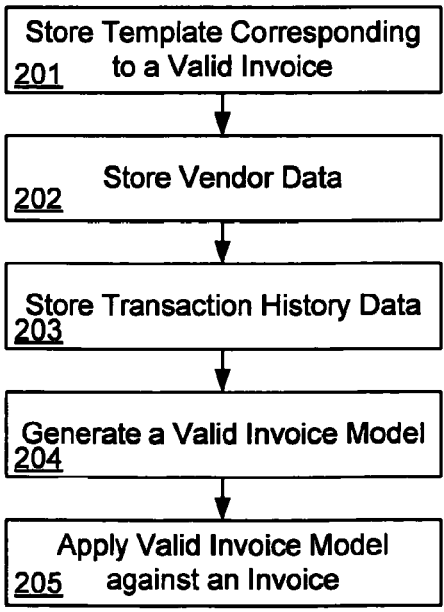
FIG. 2 illustrates a method of processing an invoice according to one embodiment of the present invention.

FIG. 2 illustrates a method of processing an invoice according to one embodiment of the present invention. At 201, templates corresponding to valid invoices may be received and stored in the system. At 202, the system may receive and store master vendor data, such as the vendor name, vendor address, account number, telephone number, supplier codes, email addresses, website addresses, or any other information related to the vendor. At 203, transaction history may be received and stored in the system. Transaction history may include past invoices from one or more vendors or the results of any past invoice investigations by the receiving company, for example. It is to be understood that other context data may be received and stored in the system and used for invoice analysis and adaptation purposes. Other forms of context data may include contracts, contract parameters, contact information, shipping and receiving documents and data, purchase order numbers, or any other documents or data related to transactions between a company and a vendor. At 204, context data, including invoice templates, vendor data, and transaction history, may be used to generate a valid invoice model. The valid invoice model may define rules or patterns for associated data as applied to invoices received by the company. It is to be understood that multiple invoice models may be used if desired. Valid invoice models may be used for a particular vendor, a class of vendors, all vendors, by service, or by division of the company, for example.

Figure 3:
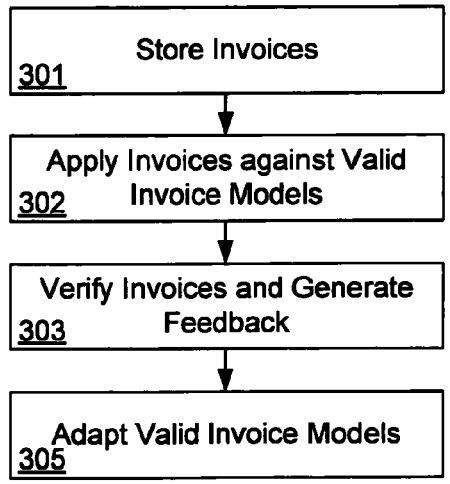
FIG. 3 illustrates a method of processing an invoice according to one embodiment of the present invention.

FIG. 3 illustrates a method of processing an invoice according to one embodiment of the present invention. As mentioned above, another aspect of the present invention is that feedback from further processing of invoices may be brought into the system to improve associations and models. For example, at 301, invoices are stored electronically in the system. At 302, the invoices are applied against valid invoice models. At 303, invoices may be verified to generate feedback for improving the associations. In one embodiment, verification may include automatically analyzing attributes or fields of an invoice for a plurality of items (e.g., missing data, data out of range, or date out of range). Verification may also include a manual check. If an invoice passed based on the invoice model, but failed verification, the invoice, together with a reasons and context behind the failure, can be fed back into the system to improve the model and associations. Other forms of feedback may include reasons and context relating to false positives (e.g., a description of why an invoice that failed based on the model was actually a valid invoice), for example. At 305, valid invoice models are adapted based on new context data, which may include the previously received invoice and/or feedback from processing of such invoice.

Figure 4:
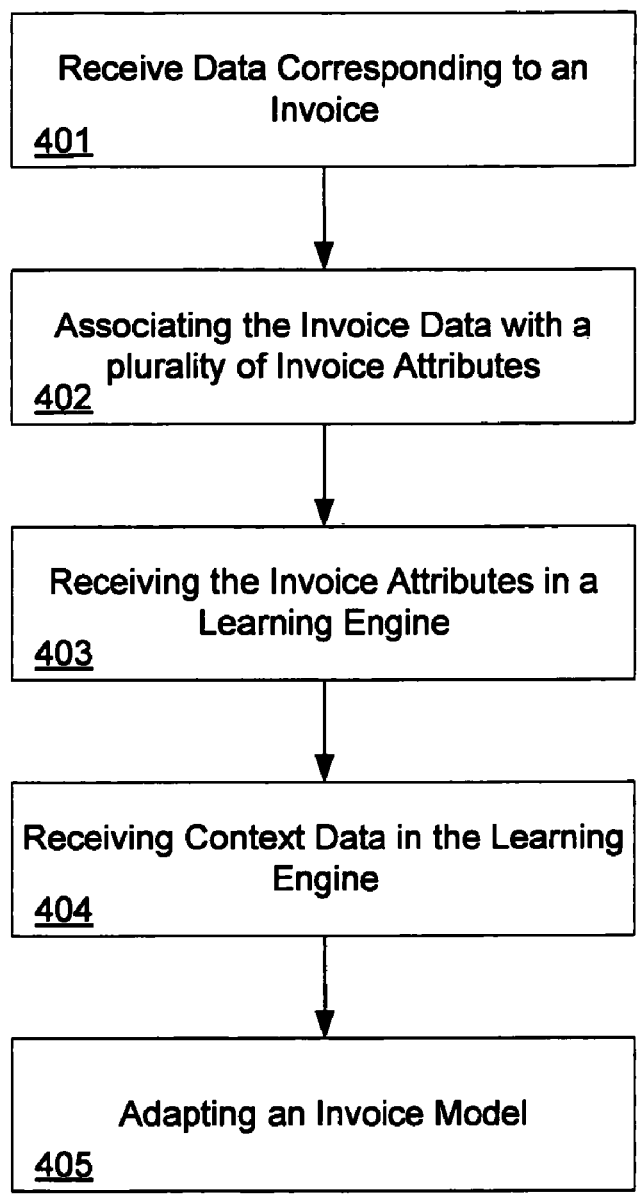
FIG. 4 illustrates a method of processing an invoice according to one embodiment of the present invention.

FIG. 4 illustrates a method of processing an invoice according to one embodiment of the present invention. As mentioned above, as invoices are received, the data from such invoices and feedback from processing the incoming invoices may be used to adapt and improve detection. This technique is illustrated in FIG. 4. At 401, data corresponding to an invoice is received in an invoice processing system. At 402, the invoice data is associated with a plurality of invoice attributes. Invoice attributes may include invoice number, date, purchase order number, payment terms (e.g., due on receipt or Net 30), remittance name and address, a total amount due, subtotal, and line item information such as a description of goods or services received, amounts, cost per item, or date of shipped goods or rendered services, for example. After such information is analyzed against an invoice model to decide whether or not the invoice is fraudulent or erroneous, the invoice attribute data may be received by a learning engine at 403. At 404, the learning engine receives context data as described above, which may include history data or feedback data from further processing of the invoice. At 405, the learning engine adapts the invoice model based on the additional data. Over time, the additional data will improve the performance of the system because the linkages in the associative memory and the accuracy of the invoice models will improve as more data is collected and fed back into the system.

Figure 5:
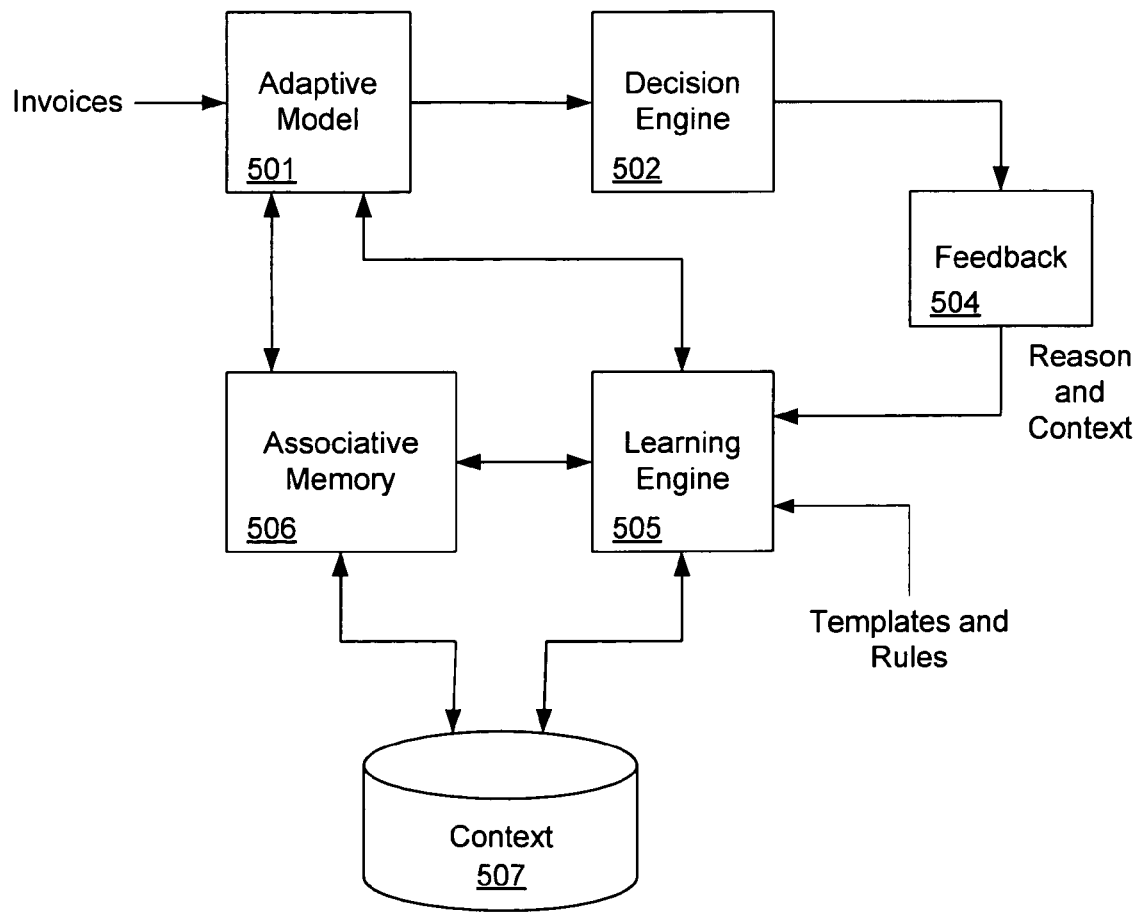
FIG. 5 is an example of an invoice processing system according to one embodiment of the present invention.

FIG. 5 is an example of an invoice processing system according to one embodiment of the present invention. Invoice processing system 500 includes an adaptive model 501, a decision engine 502, a feedback component 504, a learning engine 505, an associative memory 506 and context data store 507. Templates and rules for valid invoices may first be received in learning engine 505 and used to generate one or more initial valid invoice models (i.e., seed invoice models) and initial associations in the associative memory 506. Learning engine 505 may also access context data in repository 507 for generating the initial model and building the initial associations.

The initial model and associations may be used to detect fraudulent or erroneous invoices. When an invoice is received, it is applied against the valid invoice model and underlying associations. Decision engine 502 may be used to determine if the incoming invoice is conforming (valid) or nonconforming (invalid). In the event that decision engine 502 determines that the incoming invoice does not conform to one or more models of valid invoices, then the invoice is sent for review or investigation. As a result, feedback 504, which may include reasons and context relating to a conformity or nonconformity, may be used to adapt the models using the findings of the investigation. Feedback component 504 may include a variety of software components for providing invoice verification or further investigation. In one embodiment, feedback component 504 includes automated verification of the attributes of an invoice as described above. Alternatively, feedback component 504 may include an "INBOX," "OUTBOX," and/or software resources to allow a user to electronically review invoices and gather additional information about an invoice. Optionally, the incoming invoice, the model used to analyze the invoice, and any other context as to why the invoice was flagged for investigation is automatically sent to a user for investigation. After the investigation or review, a user can enter the results of the investigation. If the investigation shows that the invoice is indeed fraudulent or erroneous, the user can send the incoming invoice for further processing with instructions to reject the invoice and to perform any other actions consistent with company policy to remedy the source of the fraudulent or erroneous invoice. Information regarding the reason and context for the rejection of the invoice can also be entered into learning engine 505. If the investigation shows that the invoice is valid, a user can forward the invoice for payment and enter the reason and context supporting the conclusion that the invoice is valid to learning engine 505.

In addition to feedback information received during verification and investigation of invoices, learning engine 505 may receive transaction history data (e.g., past invoices and other documents and context related to such invoices) or master data (e.g., information about the vendor and service ordered) from context data store 507. Learning engine 505 then uses the information and data from up to all possible sources to generate adaptive invoice models 501 and associations in associative memory 506. When additional invoices are received, they may be applied against the invoice models and underlying associations. The models of good invoices, coupled with the associations between data in the system, allow the system to automatically determine if each incoming invoice is valid or potentially fraudulent or erroneous. Thus, as the system receives more invoices and data corresponding to the invoices (e.g., context and feedback), the associative memory and invoice models will continuously be adapted by the learning engine, resulting in improved fraud and error detection over time.

Figure 6:
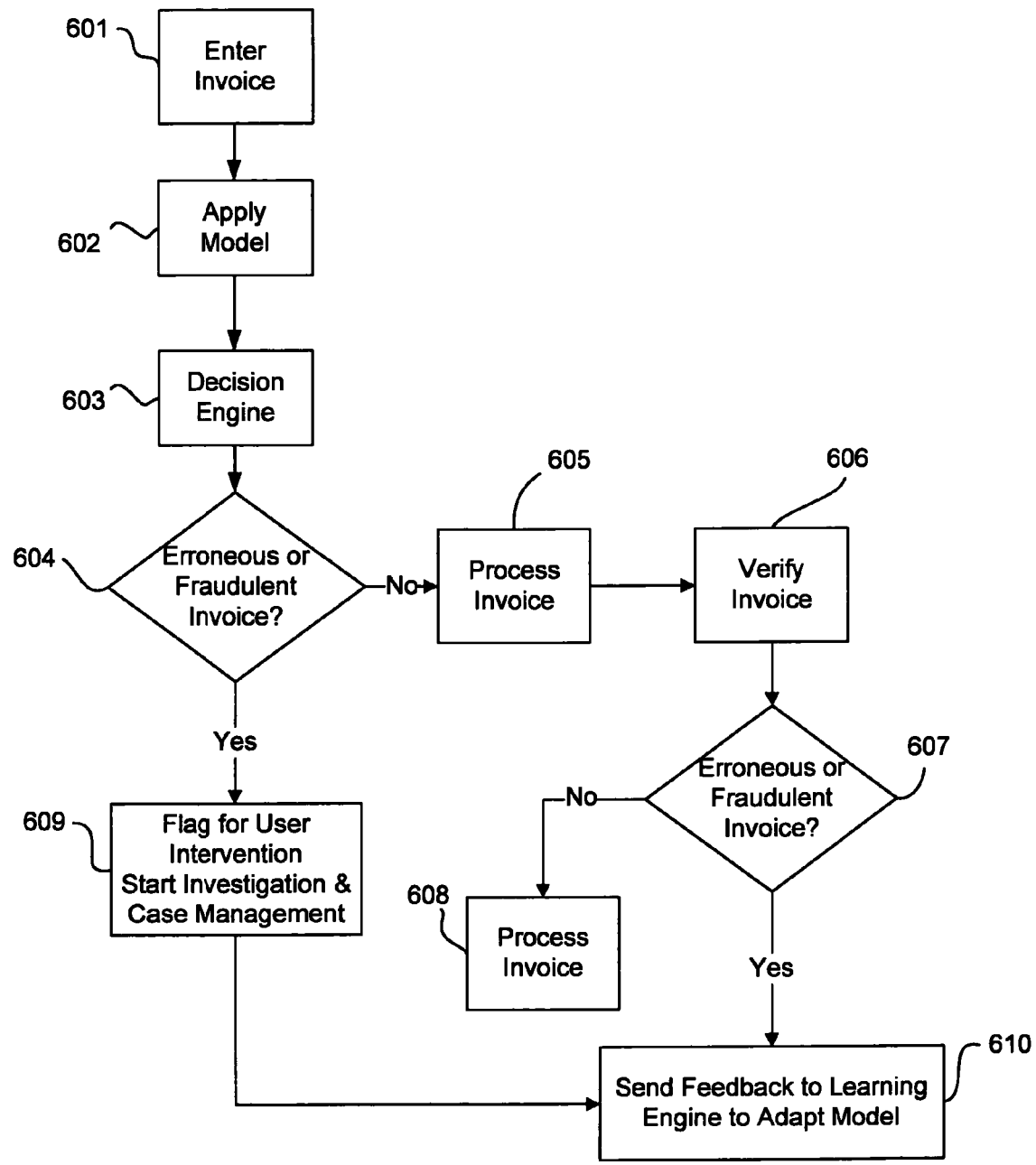
FIG. 6 illustrates a method of processing an invoice according to one embodiment of the present invention.

FIG. 6 illustrates a method of processing an invoice according to one embodiment of the present invention. At 601, an invoice is entered into an invoice processing system. In one embodiment, the invoice processing system is an Enterprise Resource Planning (ERP) package, for example. Invoices may enter the system in a variety of ways. For example, invoices may be scanned into memory and optical character recognition software may be applied to interpret the content of the invoice. In another embodiment, the invoices may be received electronically as email attachments or automatically loaded into the system over a network such as an intranet or the Internet. The relevant information from the invoice may then be stored in the appropriate fields of an invoice object, for example, in the invoice processing system, and the data elements of each invoice may be the attributes of the invoice.

Once the invoice is entered into the invoice processing system, the data in each invoice field may be processed by an invoice model at 602. The results may be fed into a decision engine at 603. For example, information from the invoice may be compared against a model of a valid invoice. At 604, the invoice may be routed depending on the results of the decision engine. If the invoice matches a model of what a valid invoice should look like, and not determined to be potentially erroneous or fraudulent, the invoice is processed at 605. In one embodiment, the processing may include sending the invoice out for final approval, entering the liability into either a specialized or general ledger, scheduling the payment date, issuing a check or other payment against the invoice, or applying an existing credit memo from the issuing vendor for the invoice. At 606, the valid invoice may be verified for validity. If the previously valid invoice is determined to be fraudulent or erroneous (e.g., by manual or automated investigation), then feedback from an investigation may be sent to a learning engine at 610 to adapt the model so that the same or similar invoices can be identified by the system. If the invoice is confirmed valid, normal processing may proceed at 608.

If the invoice is determined to be erroneous or fraudulent at 604, the invoice may be flagged for investigation at 609. Moreover, the system provides reasons and context as to why the invoice was flagged (e.g., the system may automatically highlight the fields for duplicate invoices or highlight a suspicious bank account number). Accounting personnel can then investigate the validity of an invoice and send the results to a learning engine so that the model of a valid invoice and/or underlying associations can be adapted and possible valid variations on a good invoice are incorporated into the model and associative memory for future use. Depending on the findings of the investigation, reasons and context as to why a previously suspicious invoice is acceptable may be added to the model of a valid invoice at 610.

Figure 7:
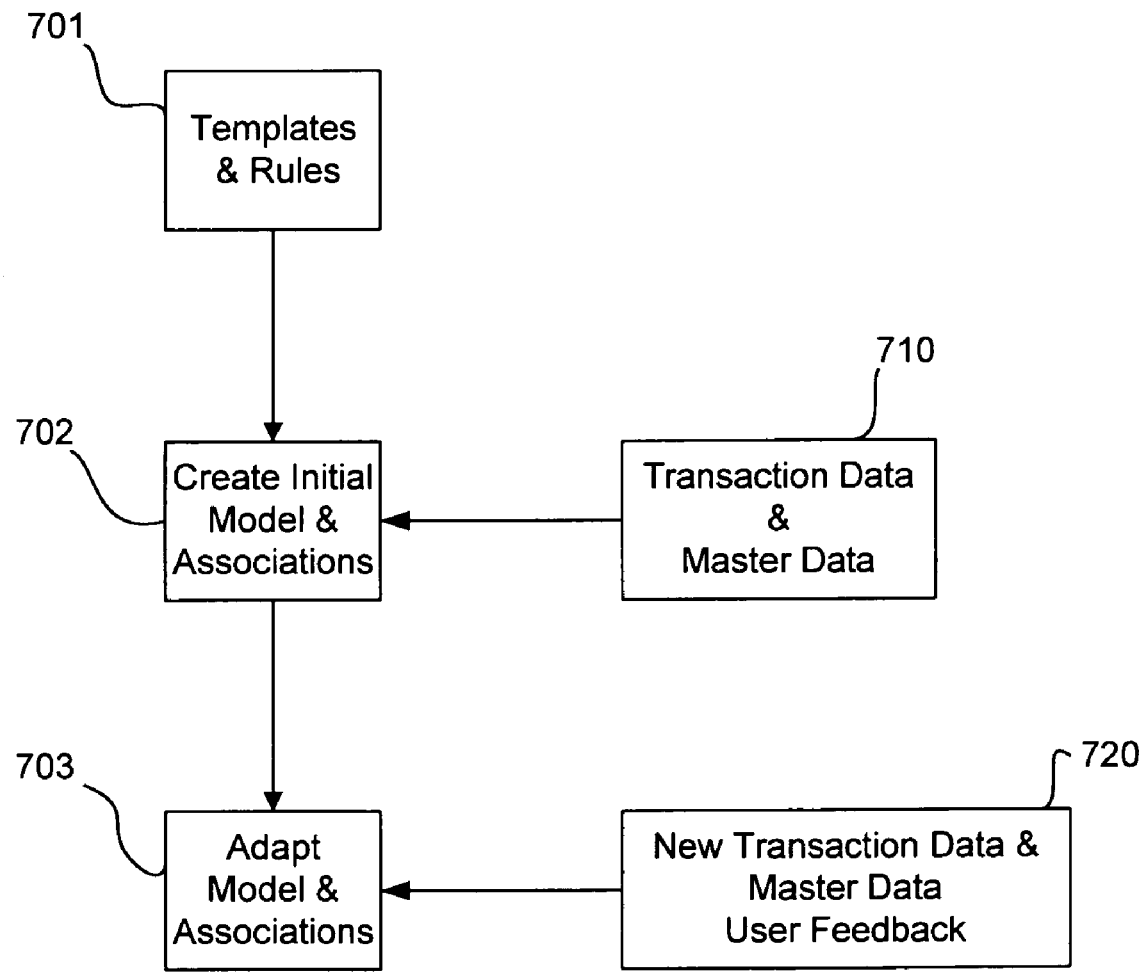
FIG. 7 is an example of invoice model creation and adaptation according to one embodiment of the present invention.

FIG. 7 is an example of invoice model creation and adaptation according to one embodiment of the present invention. At 701, templates and rules corresponding to valid invoices are received in the system. For example, templates and rules may include the style, format, or content that each invoice must adhere to or other guidelines vendors must follow in order for the invoice to be processed and the vendor paid. In one embodiment, a company may require their vendors to provide vendor specific data including, but not limited to, vendor name, vendor number, payment account number, address, or telephone number in a particular format. At 702, an initial model and associations are created. An initial model and associations may be created using invoice templates and rules together with context information such as transaction data and master data 710. For example, templates and rules may be used to synthesize an image of what a good invoice should look like when an initial model and associations are created at step 702.

Templates and rules may include specification of the required font type, size and style. In another embodiment, templates and rules may include a specification of the location and page position of certain vendor or invoice information such as vendor name, vendor number, vendor address, payment account or address, and invoice number. Templates and rules may include a specification of required line width, weight or style, physical page dimensions, or validated vendor information such as a confirmed payment address, payment account number, purchase order number, or invoice number, for example At 703, the models and associations in the associative memory may be adapted to improve fraud and error detection accuracy as more information is made available to the system. For instance, as new invoices and master data are received at 720, they may be added to the context database and used to update the models and associations in the associative memory. In one embodiment, feedback may be generated after each invoice is processed and used to adapt the models and associations. For example, when a potentially fraudulent or erroneous invoice is flagged for investigation, it may automatically be sent to accounts payable or accounting personnel. The accounts payable or accounting personnel can investigate the invoice to determine if there is anything truly fraudulent or erroneous about a suspicious invoice. When the findings are available, accounts payable or accounting personnel can provide feedback regarding the suspicious invoice, and such information may be used to adapt the model at 703.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method of processing invoices comprising:

storing, in the automated electronic processing system, a plurality of initial invoice templates and context data corresponding to a plurality of transactions, wherein each transaction has a corresponding electronic invoice, and wherein the context data comprises a plurality of data elements corresponding to each electronic invoice;

sending the invoice templates and context data to a learning engine in the automated electronic processing system;

generating, by the learning engine, a plurality of initial valid invoice models based on the invoice templates and the context data;

generating associations in an associative memory between the context data elements corresponding to each electronic invoice using the invoice templates and the context data, wherein the associations indicate relationships between context data elements for each particular electronic invoice, and wherein the valid invoice models comprise rules that operate on the associations in the associative memory to produce additional context data elements for each electronic invoice;

receiving, in the automated electronic processing system, a plurality of electronic invoices;

applying, in the automated electronic processing system, one or more of the electronic invoices against one or more the valid invoice models and associations, wherein the valid invoice models access said associations between context data elements using the associative memory and apply said rules, and in accordance therewith, identifying fraudulent or erroneous electronic invoices;

verifying, in the automated electronic processing system, the electronic invoices to identify false positives or false negatives;

receiving, in the automated electronic processing system, additional information about electronic invoices identified as false positive or false negative;

receiving the additional information in the learning engine; and updating the valid invoice models and associations based on the additional information.

2. The method of claim 1 wherein the context data includes transaction history data.

3. The method of claim 1 wherein the context data includes vendor master data.

4. The method of claim 1 further comprising flagging one or more electronic invoices if the first valid invoice model indicates that the one or more electronic invoices are fraudulent or erroneous.

5. The method of claim 1 further comprising sending one or more electronic invoices to a user for investigation, wherein the additional information comprises feedback from the user.

6. The method of claim 1 wherein the additional information comprises data generated while verifying the invoice.

7. A system comprising:

an automated electronic processing system comprising a context data store, an associative memory coupled to the context data store, and a learning engine, wherein the automated electronic processing system stores a plurality of initial invoice templates and context data corresponding to a plurality of transactions, wherein each transaction has a corresponding electronic invoice, and wherein the context data comprises a plurality of data elements corresponding to each electronic invoice;

wherein the invoice templates and context data are sent to the learning engine in the automated electronic processing system to generate a plurality of initial valid invoice models based on the invoice templates and the context data;

wherein associations are generated in the associative memory between the context data elements corresponding to each electronic invoice using the invoice templates and the context data, wherein the associations indicate relationships between context data elements for each particular electronic invoice, and wherein the valid invoice models comprise rules that operate on the associations in the associative memory to produce additional context data elements for each electronic invoice;

wherein the automated electronic processing system receives a plurality of electronic invoices and applies one or more of the electronic invoices against one or more the valid invoice models and associations, wherein the valid invoice models access said associations between context data elements using the associative memory and apply said rules, and in accordance therewith, identify fraudulent or erroneous electronic invoices;

wherein the electronic invoices are verified to identify false positives or false negatives; and wherein the automated electronic processing system receives additional information about electronic invoices identified as false positive or false negative, and the additional information is received in the learning engine, and in accordance therewith, the valid invoice models and associations are updated based on the additional information.

8. The system of claim 7 wherein the context data includes transaction history data.

9. The system of claim 7 wherein the context data includes vendor master data.

10. The system of claim 7 wherein one or more electronic invoices are flagged if the first valid invoice model indicates that the one or more electronic invoices are fraudulent or erroneous.

11. The system of claim 7 wherein one or more electronic invoices are sent to a user for investigation, wherein the additional information comprises feedback from the user.

12. The system of claim 7 wherein the additional information comprises data generated while verifying the invoice.

13. An automated electronic processing system comprising:

means for storing, in the automated electronic processing system, a plurality of initial invoice templates and context data corresponding to a plurality of transactions, wherein each transaction has a corresponding electronic invoice, and wherein the context data comprises a plurality of data elements corresponding to each electronic invoice;

means for sending the invoice templates and context data to a learning engine in the automated electronic processing system;

means for generating, by the learning engine, a plurality of initial valid invoice models based on the invoice templates and the context data;

means for generating associations in an associative memory between the context data elements corresponding to each electronic invoice using the invoice templates and the context data, wherein the associations indicate relationships between context data elements for each particular electronic invoice, and wherein the valid invoice models comprise rules that operate on the associations in the associative memory to produce additional context data elements for each electronic invoice;

means for receiving, in the automated electronic processing system, a plurality of electronic invoices;

means for applying, in the automated electronic processing system, one or more of the electronic invoices against one or more the valid invoice models and associations, wherein the valid invoice models access said associations between context data elements using the associative memory and apply said rules, and in accordance therewith, identifying fraudulent or erroneous electronic invoices;

means for verifying, in the automated electronic processing system, the electronic invoices to identify false positives or false negatives;

means for receiving, in the automated electronic processing system, additional information about electronic invoices identified as false positive or false negative;

means for receiving the additional information in the learning engine; and means for updating the valid invoice models and associations based on the additional information.

\* \* \* \* \*